United States Patent [19]

Trumble

[11] 3,787,687

[45] Jan. 22, 1974

[54] ULTRAVIOLET RADIATION DOSIMETER
[76] Inventor: Terry M. Trumble, 5718 Rockingham Dr., Dayton, Ohio 45429
[22] Filed: Feb. 23, 1972
[21] Appl. No.: 228,644

[52] U.S. Cl............................................. 250/83 CD
[51] Int. Cl. .............................................. G01t 1/04
[58] Field of Search 250/83 CD, 83.3 UV; 252/408; 116/114 R

[56] References Cited
UNITED STATES PATENTS
3,449,572  6/1969  Sylvester et al. ............... 250/83 CD
3,194,963  7/1965  McKee ........................... 250/83 CD
2,949,880  8/1960  Fromer ........................... 250/83 CD Primary Examiner—James W. Lawrence
Assistant Examiner—Davis L. Willis
Attorney, Agent, or Firm—Harry A. Herbert, Jr. et al.

[57] ABSTRACT

An ultraviolet radiation dosimeter is provided that comprises a transparent or white film containing a 1,3-,3-trimethylindolinobenzopyrylospiran and adjacent to the film a color chart having at least two shades of the color to which the substituted spiropyran changes upon exposure to ultraviolet radiation.

13 Claims, 3 Drawing Figures

PATENTED JAN 22 1974 3,787,687
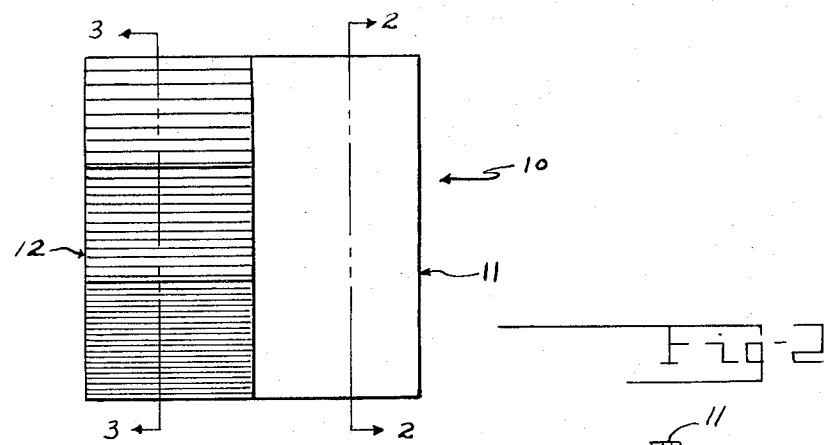
Fig·1
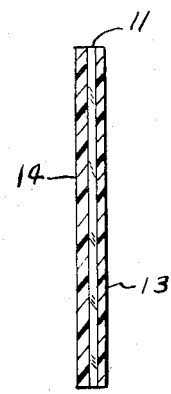
Fig·2
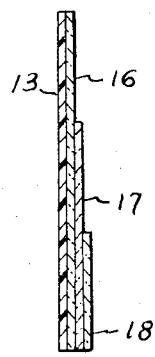
Fig·3

3,787,687

ULTRAVIOLET RADIATION DOSIMETER

FIELD OF THE INVENTION

This invention relates to an ultraviolet radiation dosimeter. In one aspect it relates to a method of determining the dosage of ultraviolet radiation to which an individual or light-sensitive material can be subjected without injury or damage.

BACKGROUND OF THE INVENTION

It is well known that ultraviolet rays can produce harmful effects in individuals when they are exposed to the rays for inordinately long periods of time. The harmful effects that result from exposure to the sun are generally manifested by what is termed a sunburn. A sunburn at the very least can be painful while a severe case can result in such serious damage to the body tissue as to cause blindness or cancer. Furthermore, there are other situations in which exposure to ultraviolet radiation may produce harmful or damaging results when the degree of exposure is not monitored. These situations run the gamut from work in certain laser laboratories to the storage of documents. A particularly dangerous condition may occur in the case of astronauts during flights through outerspace. During such flights it is important to determine the amount of exposure to ultraviolet radiation before there has been a sufficient accumulation to produce photokeratitis, a non-permanent disabling condition which might jeopardize a mission.

It is an object of this invention, therefore, to provide an ultraviolet radiation dosimeter which has the capability of measuring the amount of radiation to which a person or object is exposed.

Another object of the invention is to provide an ultraviolet radiation dosimeter which, after use, can be reused by causing the dosimeter to return to its original state.

A further object of the invention is to provide an ultraviolet radiation dosimeter which is sensitive to erythermal radiation, i.e., ultraviolet rays having a wavelength ranging from about 2900 A to 4000 A.

Still another object of the invention is to provide a method of determining the amount of ultraviolet radiation to which an individual or material is exposed.

A still further object of the invention is to provide an ultraviolet radiation dosimeter which has a long shelf life when protected from actinic light.

Other objects and advantages of the invention will become apparent to those skilled in the art upon consideration of the accompanying disclosure and the drawing, in which:

FIG. 1 is a plan view, illustrating an ultraviolet radiation dosimeter of this invention;

FIG. 2 is an elevational view taken along line 2—2 of FIG. 1; and

FIG. 3 is an elevational view taken along line 3—3 of FIG. 1.

SUMMARY OF THE INVENTION

Broadly stated, the present invention resides in an ultraviolet radiation dosimeter which comprises a transparent or white film containing a 1,3,3-trimethylindolinobenzopyrylospiran and adjacent to the film a color chart having at least two shades of the color to which the substituted spiropyran changes upon exposure to ultraviolet radiation.

In one embodiment the invention lies in a method for determining the dosage of ultraviolet radiation to which an individual or object is subjected which comprises the steps of preparing a transparent or white film containing a 1,3,3-trimethylindolinobenzopyrylospiran; preparing a color chart of different shades of the same color to which the film changes upon exposure to ultraviolet radiation; exposing the transparent or white film to ultraviolet radiation of known intensity; recording the time and level of ultraviolet radiation required for the film to change to the color of each shade of the color chart; heating the film, thereby causing it to revert to its original transparent or white state; placing the color chart and film in its transparent or white state in the environment in which the individual or object is located; and comparing the color of the film with the color chart to determine the dosage of ultraviolet radiation to which the individual or object has been subjected.

The film used in the practice of this invention is prepared by initially dissolving a polymeric or resinous material in a solvent therefor and thereafter adding the substituted spiropyran. As discussed hereinafter, other orders of addition can also be used in preparing the solution. The resulting solution is then applied to a clean, smooth surface, such as a glass surface, and allowed to dry. The drying time can be shortened by heating the coated surface at a temperature sufficient to evaporate the solvent. The film formed on the surface is then stripped from the surface for use in fabricating the dosimeter. The film generally has a thickness ranging from about 1 to 5 mils. It is also within the scope of the invention to cast the film on a white surface material, such as paper, which then functions as the base as described hereinafter.

In preparing the film it is usually preferred to utilize a synthetic polymer or resin although it is within the scope of the invention to use natural resins. Examples of synthetic polymers or resins that can be used include alkyds, prepared by reacting phthalic, fumaric or maleic anhydride with a polyhydroxy compound, such as glycerol, pentaerithritol, and sorbitol; nitrocellulose; phenolics, such as phenol-formaldehydes and phenol-furfural; amino resins, such as urea-formaldehyde and melamine-formaldehyde; vinyls, such as polyvinyl acetate, polyvinyl alcohol, polyvinyl butyral, polyvinyl pyrrolidone, copolymers of vinyl acetate and vinyl chloride; acrylates, such as polymethacrylate, polymers of methyl methacrylate and polymers of butyl acrylate; and the like.

Various classes of materials can be used as the solvent. Examples of suitable solvents include aromatic hydrocarbons, such as benzene, toluene and the xylenes; chlorinated hydrocarbons, such as trichloroethylene; alcohols, such as ethanol and butanol; ketones, such as acetone, isobutyl ketone and methyl ethyl ketone; esters, such as ethyl acetate; and the like. Furthermore, mixtures of the aforementioned compounds can be utilized as the solvent.

The solution may in addition to the polymer or resin contain a white pigment. The presence of the pigment is particularly desirable when the particular polymer or resin used results in a film that is not transparent. Examples of suitable white pigments that can be employed include titanium dioxide, zinc oxide and calcium carbonate.

The substituted spiropyrans that are added to the solution constitute a class of dyes that are sensitive to ultraviolet radiation, particularly erythermal rays having wavelengths ranging from about 2900 A to 4000 A. Furthermore, the substituted spiropyrans are sensitive to erythermal rays even on cloudy days. The substituted spiropyrans can also be identified as 1,3,3-trimethylindolinobenzopyrylospirans and they can be represented by the following structural formula:

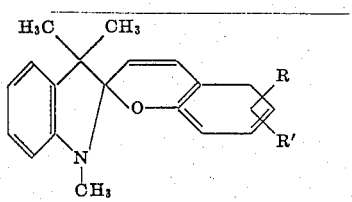

wherein R and R' are selected from the group consisting of H, $NO_2$, Cl, Br, alkyl, alkenyl and alkoxy. The alkyl, alkenyl, and alkoxy groups preferably contain from 1 to 6, inclusive, carbon atoms. The substituted spiropyrans are prepared by reacting salicylaldehyde or a derivative thereof with 1,3,3-trimethyl-2-methyleneindoline. Examples of suitable substituted spiropyrans with their colors indicated in parentheses include 6',8'-dibromo-1,3,3-trimethylindolinobenzopyrylospiran (blue); 6'-nitro-8'-methoxy-1,3,3-trimethylindolinobenzopyrylospiran (blue); 6'-nitro-1,3,3-trimethylindolinobenzopyrylospiran (purple); 7'-chloro-1,3,3-trimethylindolinobenzopyrylospiran (purple); 6'-nitro-8'-allyl-1,3,3-trimethylindolinobenzopyrylospiran (purple); 6'-nitro-8'-bromo-1,3,3-trimethylindolinobenzopyrylospiran (purple); 6'-chloro-8'-nitro-1,3,3-trimethylindolinobenzopyrylospiran (purple); 6'-bromo-8'-nitro-1,3,3-trimethylindolinobenzopyrylospiran (purple); 6'-methoxy-8-nitro-1,3,3-trimethylindolinobenzopyrylospiran (green); 5'-nitro-8'-methoxy-1,3,3-trimethylindolinobenzopyrylospiran (green); and the like.

The amounts of the materials in the formulation used in preparing the solution can vary within rather wide limits. However, the amounts usually range from about 20 to 70 parts by weight of the film-forming polymer or resin, 25 to 80 parts by weight of the solvent, and zero to 5 parts by weight of the white pigment. Generally, the amount of the substituted spiropyran added to the solution ranges from about 0.25 to 1.0 parts by weight, based on 100 parts by weight of the solution. In the photochromic film itself after evaporation of the solvent, the ratio of spiropyran to polymer or resin, on a weight basis, is 0.25:1 to 20:70. The substituted spiropyran can be added directly to the solution, but it is preferably in solution in the same solvent as, or a different solvent from, that in which the resin or polymer is dissolved. Also, the substituted spiropyran can be included in the solvent in which the film-forming polymer or resin is to be dissolved. When a white pigment is included, it is usually introduced after formation of the solution.

A better comprehension of the invention can be obtained by referring to the drawing in which the same numerals are used in the figures to identify the same elements. As shown in FIG. 1, dosimeter 10 is composed of two principal parts, namely, a film 11 and a color chart or standard 12. The film is prepared as described hereinabove after which it can be trimmed to any convenient size. Referring to FIG. 2, it is seen that the film is positioned on a base 13 which is preferably formed of white paper, such as bristol board, although a base fabricated from a sheet of a polymeric material, such as polyethylene, can be used. The film can be secured to the base by any suitable means, e.g., by staples or by an adhesive applied between the outer edges of the two elements. A filter 14 may be positioned on film 11 for the purpose of eliminating ultraviolet rays having short wavelengths and to reduce the intensity of the incoming radiation. The dosimeter is thereby rendered more sensitive to the ultraviolet rays of longer wavelength, and the time required to effect a change in the color of the film is increased. This latter effect makes it possible to more effectively calibrate the dosimeter in terms of time required to cause a color change. However, it is within the scope of the invention to omit the filter, particularly when very small amounts of the substituted spiropyran are present in the film. The filter used must be formed of a clear, transparent material, such as glass. However, it is usually preferred to use a sheet of polymethacrylate. By varying the thickness of the filter, the amount of ultraviolet radiation reaching the film per unit of time can be varied. The filter can be attached to the film by any suitable means, such as by use of an adhesive between the outer edges of the film and the filter. Also, the base, the film and the filter can all three be stapled or clamped together.

Color chart or standard 12 consists of a plurality of pieces or strips of colored transparent film of varying lengths superimposed upon one another. The basic color chart film is the same as that of film 11 after exposure to ultraviolet radiation. As depicted in FIG. 3, a length of film 16 positioned on base 13 has the same length as the base. Film 17 rests on film 16 and has a shorter length than the latter film. Finally, film 18, which is positioned in film 17, is shorter in length than film 17. The three lengths of film can be attached to the base and to one another by means of staples, clamps, an adhesive, or other suitable means.

From the foregoing description, it is seen that the color chart is divided into three parts, a part with three layers of film, a part with two layers of film and a part with one layer of film. Because of this arrangement, the chart has three different shades of the same basic color. It is to be understood that any number of layers of film greater than two can be used to provide any desired number of different shades of the basic color. Also, it is within the scope of the invention to employ other methods of fabricating a color chart. For example, color chips or paints of different shades of the same color can be prepared and applied to the base.

Different procedures can be employed in calibrating the dosimeter. According to one procedure, film 11 is exposed to a source of ultraviolet radiation of known intensity, such as an ultraviolet light. When the color of the film corresponds to the color of the single thickness of the color chart film, the time and the dosage of radiation in microwatts per square centimeter of film 11 are recorded. This procedure is continued, thereby obtaining similar data for the color of film 11 corresponding to the color of the two layers and the three layers of film of the color chart. Film 11 is then heated to a temperature that is sufficient to return the film to its original transparent or white state. Thereafter, until it is desired to use the dosimeter to monitor an environment for the presence and intensity of ultraviolet radiation, the dosimeter is stored, e.g., in a black cloth bag, so that it does not become exposed to actinic light.

In another procedure for calibrating the dosimeter, film 11 is exposed to ultraviolet radiation of known intensity for a definite period of time, e.g., for 15 minutes. Thereafter, the color of film 11 is matched with, e.g., a color chip or transparent film which corresponds thereto. The exposure of film 11 to the ultraviolet radiation is then continued for different additional intervals of time, e.g., 15 minutes and 30 minutes, with color matching being carried out after each interval. The color chips are separately positioned on base 13, or in the case of the use of transparent film the several layers are disposed on the base.

In the case of a dosimeter calibrated according to either of the foregoing procedures, the different shades of color of the color chart can advantageously be labelled with the time and/or dosage of ultraviolet radiation corresponding to the particular shade. In the use of the dosimeter in preventing sunburn, it is particularly important to use a time label in order that an individual may be readily informed as to the level of radiation to which he has been exposed. Since the level of radiation which a person can tolerate without damage to skin tissue depends upon the pigmentation of the tissue, the tolerance level varies with persons of light, medium and dark complexions. Thus, by use of the dosimeter, persons of various complexions can gauge the time during which they can expose themselves to the sun without the danger of sunburn. Furthermore, the dosimeter is effective on cloudy, overcast days when the danger of sunburn may be even greater than on sunny days because of the tendency for individuals to overlook or disregard the effects of ultraviolet radiation on such days.

A more thorough understanding of the invention may be obtained by referring to the following illustrative example which is not intended, however, to be unduly limitative of the invention.

EXAMPLE

A dosimeter was fabricated that was similar to the one shown in the drawing. In preparing the photochromic film, a solution containing 40 parts by weight of toluene and 60 parts by weight of polymethacrylate was initially prepared. To this solution there was then added a solution of 6'-nitro-8'-methoxy-1,3,3-trimethylindolinobenzopyrylospiran in toluene. The amount of the substituted spiropyran added was 0.1 part by weight, based on 100 parts by weight of the originally prepared solution. The solution was poured on a flat surface and allowed to harden. The film having a thickness of about 2.5 mils was then peeled from the surface and cut to a size corresponding to about one-half the area of the white base material. The film was positioned on one-half of the base after which a filter in the form of a sheet of polymethacrylate was placed on the film. The color chart was formed on the other half of the base by positioning thereon a strip of a blue transparent film. Two other shades of blue were obtained by imposing on the first strip two additional strips of different lengths. Thus, the color chart consisted of three different shades of blue, the basic color of the substituted spiropyran after exposure to ultraviolet radiation.

The dosimeter, prepared as described above, was then calibrated by subjecting the photochromic film to a source of ultraviolet radiation of known intensity. The times required and the level of radiation for the color of the photochromic film to correspond to each color shade of the color chart were recorded. Thereafter, the dosimeter was heated sufficiently to cause the film to revert to its original transparent state after which it was stored out of the presence of actinic light.

When used as a dosimeter to prevent sunburn, each shade of the color chart can advantageously have marked thereon the time in minutes that an individual can safely sunbathe. For example, depending upon the dosage of radiation required for the photochromic film to change color to correspond to each shade of the color chart, the times that a person having a particular complexion, e.g., light, medium or dark, can tolerate exposure to the radiation can be readily determined from levels recommended by the medical profession. Thus, the dark, medium and light blue portions of the color chart may be marked with 15, 30 and 60, respectively, to indicate that a light complexioned person can tolerate 15 minutes of exposure if the photochromic film changes to the dark blue color. Similarly, if the film changes to medium or light blue, the individual can tolerate 30 and 60, respectively, minutes of exposure.

While the dosimeter has been described specifically with respect to its use in obviating injury from sunburn, as mentioned above, it can also be employed in a variety of other applications. The dosimeter has many advantages, including its small and compact size and the ease with which it can be fabricated. Furthermore, the fact that the dosimeter can be re-used a number of times with reproducible results is a very important advantage from a utility standpoint. Still other advantages accrue from its sensitivity to ultraviolet radiation and the ease with which it may be calibrated.

As will be evident to those skilled in the art, various modifications of the invention can be made in the light of the foregoing disclosure without departing from the spirit or scope of the invention.

I claim:

1. An ultraviolet radiation dosimeter comprising a base; a polymeric film containing a 1,3,3-trimethylindolinobenzopyrylospiran positioned on a portion of the base; a filter positioned on the polymeric film, the filter being adapted to eliminate ultraviolet rays having short wavelengths; and a color chart positioned on the base adjacent the polymeric film, the chart consisting of a plurality of pieces of colored transparent film of varying lengths superimposed upon one another, the basic color of the color chart film being the same as that of the polymeric film after exposure to ultraviolet radiation.

2. The dosimeter according to claim 1 in which the polymeric film is a transparent polymeric film.

3. The dosimeter according to claim 1 in which the polymeric film is a white polymeric film.

4. The dosimeter according to claim 1 in which the 1,3,3-trimethylindolinobenzopyrylospiran corresponds to the following structural formula:

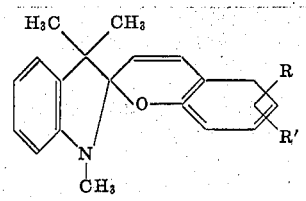

wherein R and R' are selected from the group consisting of H, $NO_2$, Cl, Br, alkyl, alkenyl and alkoxy.

5. The dosimeter according to claim 1 in which the polymeric film and the color chart are positioned on a flat base formed of a white material.

6. The dosimeter according to claim 1 in which the polymeric film is formed of a polymer or resin selected from the group consisting of alkyds, phenolics, amino resins, vinyls and acrylates.

7. The dosimeter according to claim 6 in which the polymeric film is polymethacrylate and the 1,3,3-trimethylindolinobenzopyrylospiran is 6'-nitro-8'-methoxy-1,3,3-trimethylindolinobenzopyrylospiran.

8. The dosimeter according to claim 6 in which the ratio of the 1,3,3-trimethylindolinobenzopyrylospiran to polymer or resin, on a weight basis, is 0.25:1 to 20:70.

9. A method for determining the dosage of ultraviolet radiation to which an individual or object is subjected which comprises the steps of:
 1. preparing a transparent polymeric film containing a 1,3,3-trimethylindolinopyrylospiran;
 2. preparing a color chart of at least two different shades of the same color to which the film changes upon exposure to ultraviolet radiation;
 3. exposing the transparent film to ultraviolet radiation of known intensity;
 4. recording the time of exposure to and level of ultraviolet radiation required for the film to change to the color of each shade of the color chart;
 5. heating the film, thereby causing it to revert to its original transparent state;
 6. placing the color chart and film in its transparent state in the environment in which the individual or object is located; and
 7. comparing the color of the film with the color chart to determine the dosage of ultraviolet radiation to which the individual has been subjected.

10. The method according to claim 9 in which the transparent film comprises a resin or polymer selected from the group consisting of alkyds, phenolics, amino resins, vinyls and acrylates and the 1,3,3-trimethylindolinobenzopyrylospiran corres-ponds to the following structural formula:

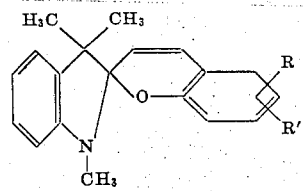

wherein R and R' are selected from the group consisting of H, $NO_2$, Cl, Br, alkyl, alkenyl and alkoxy.

11. The method according to claim 10 in which the polymer is polymethacrylate and the 1,3,3-trimethylindolinobenzopyrylospiran is 6'-nitro-8'-methoxy-1,3,3-trimethylindolinobenzopyrylospiran.

12. The method according to claim 10 in which the film contains a white pigment.

13. A method for determining the dosage of ultraviolet radia-tion to which an individual or object is subjected which comprises the steps of:
 1. preparing a white polymeric film containing a 1,3,-3-trimethylindolinopyrylospiran;
 2. preparing a color chart of at least two different shades of the same color to which the film changes upon exposure to ultraviolet radiation;
 3. exposing the white film to ultraviolet radiation of known intensity;
 4. recording the time of exposure to and level of ultraviolet radiation required for the film to change to the color of each shade of the color chart;
 5. heating the film, thereby causing it to revert to its original white state;
 6. placing the color chart and film in its white state in the environment in which the individual or object is located; and
 7. comparing the color of the film with the color chart to determine the dosage of ultraviolet radiation to which the individual has been subjected.

* * * * *